S. HENRY.
Awl-Handles.

No. 152,228. Patented June 23, 1874.

Witnesses.
Geo. Gray.
F. C. Hale.

Stephen Henry
by his atty.
F. P. Hale.

UNITED STATES PATENT OFFICE.

STEPHEN HENRY, OF MARSHFIELD, MASSACHUSETTS.

IMPROVEMENT IN AWL-HANDLES.

Specification forming part of Letters Patent No. 152,228, dated June 23, 1874; application filed March 25, 1874.

*To all whom it may concern:*

Be it known that I, STEPHEN HENRY, of Marshfield, in the county of Plymouth and State of Massachusetts, have invented a new and useful Improvement in Awl-Handles; and I do hereby declare the following to be a full, clear, and exact description of the invention, such as will enable others skilled in the art to which it pertains to make and use it, reference being had to the accompanying drawing, which forms part of this specification.

Figure 1:
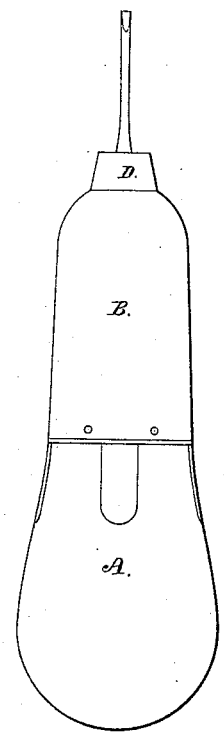
Figure 2:
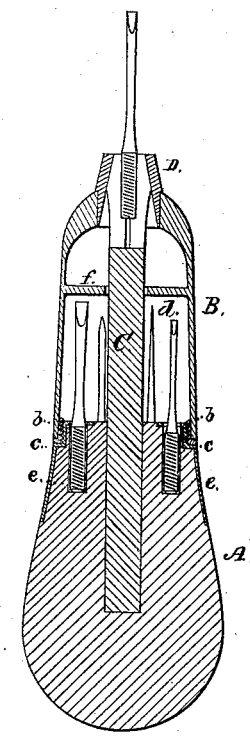

In the drawing, Figure 1 denotes a side elevation, and Fig. 2 a longitudinal and central section, of an awl-handle, constructed in accordance with my invention.

My invention has reference to that class of awl-handles having a split metallic shaft, in which the shank of the awl or tool is inserted and clamped by means of a sleeve or tapering socket-piece, operating on the tapering head or end of the said shaft; and my invention consists in the peculiar construction, combination, and arrangement of the several parts, as hereinafter described and claimed.

The object of my invention is to provide a simple, cheap, and effective implement for the purpose designed.

In the said drawing, A and B denote the two halves or parts of the handle, the part A being formed solid and having the shank of the furcated shaft C driven axially thereon and firmly secured. The part B is of a hollow conoidal shape and may be formed of hard rubber or any other suitable material, such part having a frusto-conic sleeve, D, firmly secured to one end thereof, the larger end of the part B having a female screw, $b$, formed therein to receive the male screw, $c$, formed upon the lesser end of the part A. The inner end of the part A is formed with a series of holes, $e$ $e$, &c., to receive the shanks of a set of supernumerary awls or tools, the part B being made hollow and with a partition, $f$, extending across the same, such constituting a chamber, $d$, for the projecting ends of the supernumerary tools, and serving to preserve them in their sockets. By thus forming the handle in two parts, and securing the tapering furcated shaft on one and the conical sleeve to the other, as described, and forming a female screw in the larger end of one and a corresponding male screw on the contiguous end of the other, the screw connection thus formed serves, not only to unite the two parts of the handle, but at the same time to clamp the jaws of the furcated shaft upon the tool. So also by forming the part A with sockets to receive the shanks of the extra or supernumerary tools, and the part B with the chamber $d$ to inclose the same, the tools are so located that, in case of breakage of the one employed, the simple act of unscrewing the part B to release the broken tool uncovers the tools, and enables one to be readily seized and inserted in the jaws, and the simple act of turning the part B to clamp the jaws closes the awl-chamber and connects the parts of the handle.

I do not claim the invention as shown and described in Letters Patent No. 6,261, nor that shown in the rejected application of J. Gooding, Jr.

What I claim, as an improvement upon the patent granted to me on March 3, 1874, is—

The improved awl-handle, consisting of the two parts A and B, the part A being provided with the tool-sockets $e$ $e$, furcated jaw-shaft C, and male screw $c$, and the part B, with the chamber $d$, frusto-conic sleeve D, and female screw $b$, the whole being combined and arranged in manner as shown and described.

In testimony that I claim the foregoing I have hereunto set my hand this 28th day of February, 1874.

STEPHEN HENRY.

Witnesses:
F. P. HALE,
F. C. HALE.